June 30, 1964    E. J. GROSE    3,138,829
TWO WAY DOOR ASSEMBLY

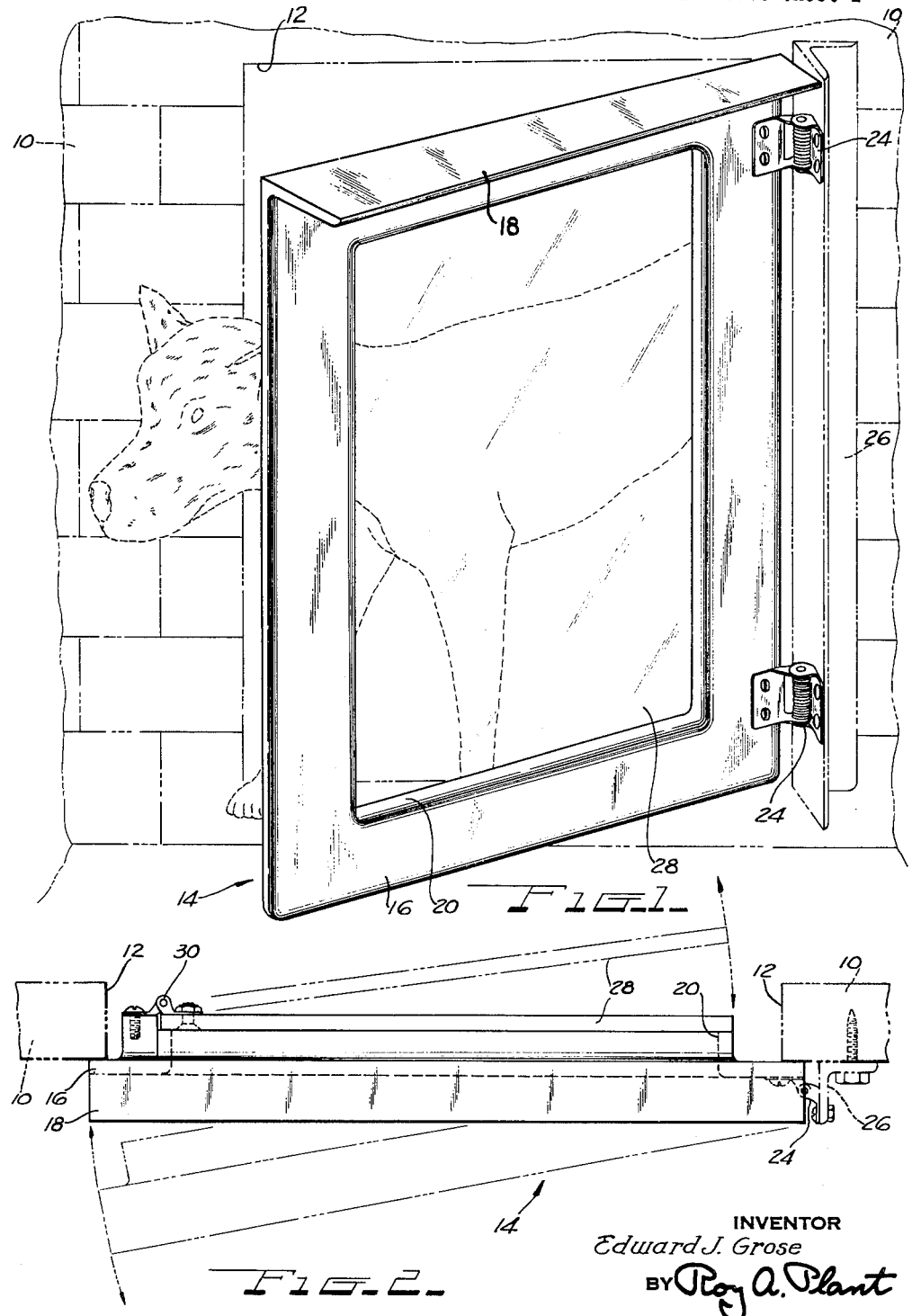

Filed April 26, 1962    2 Sheets-Sheet 2

INVENTOR
Edward J. Grose
BY Roy A. Plant
ATTORNEY

3,138,829
TWO WAY DOOR ASSEMBLY
Edward J. Grose, R.R. 1, Box 241, Augusta, Mich.
Filed Apr. 26, 1962, Ser. No. 190,396
1 Claim. (Cl. 20—16)

This invention pertains to a door assembly for an opening in an animal enclosure and, in particular, to a two-way door assembly for an opening in a kennel, enclosed runway for dogs and the like.

It has long been recognized as being desirable to provide a door for the opening or openings in a kennel, enclosed dog runway and the like to prevent drafts therein and otherwise to contribute to the health and comfort of the animals housed therein while, at the same time, permitting ready ingress and egress for the animals through such openings. One type of door which has been used consists simply of a piece of burlap, carpet or the like nailed or otherwise secured along the upper edge of the opening which aids in preventing drafts within the kennel or the like while permitting the animals to readily pass thereby. Unfortunatly, canines have the habit, particularly when resting within their kennels, of chewing and pawing anything attractive and available with the result that such burlap, carpet and similar types of door materials are very short-lived. Furthermore, canines are very curious and desire to investigate the slightest disturbance, scent or the like originating exteriorly of their kennel which requires them to disturb their rest and to leave the kennel to investigate the attraction since they cannot see outside the kennel through the burlap, carpet or similar type of door material. In addition, as the animals enter and leave the kennel past such a fabric type of door, bacterial-laden debris rubs from their bodies onto the door materials necessitating that the latter be periodically removed from the kennel for washing or cleaning to maintain the material sanitary. In this regard, however, an additional problem is presented by the fact that such burlap and carpet materials and the like tend to deteriorate rapidly when washed or cleaned using the disinfectants and cleaning chemicals often required to adequately clean the material.

Other types of doors have been suggested and used in an effort to improve upon the burlap and carpet doors. For example, it has also been suggested to utilize a sheet of rubber with a slit up the center thereof or a plurality of sheet strips of rubber which permit ready ingress and egress to and from the kennel. However, although longer-lived than the burlap or carpet type of door, the animals still chew these rubber type doors ultimately requiring replacement of same, and the problems of periodic removal from the kennel for cleaning, the deleterious effects of strong disinfectants and cleaning chemicals and the fact that the animals cannot readily see past this rubber type of closure are still serious. One other type of closure of note has comprised a plurality of elements or strips of rubber or the like arranged in relation to each other much like the shutter of a camera to form an eye therethrough for ingress and egress by the animals. However, much the same problems as discussed above are still presented and, as a matter of fact, the problem of sanitation is considerably aggrevated with a shutter type door since, as the animal passes therethrough, the shutter elements closely engage his body rubbing therefrom the bacteria-laden debris. One additional and very serious problem presented by a shutter type door is that once the animal starts through the eye of the shutter he cannot back out thereof. It was the recognition of these and other problems in this art which lead to the conception and development of the present invention.

Therefore, the objects and features of the present invention include the provision of a door assembly for the opening of an animal enclosure permitting ready ingress and egress therethrough while offering a total solution to the problems discussed above as well as others.

It is yet another object and feature of this invention to provide a door assembly permitting ingress and egress through an opening in the wall of an animal enclosure such as a kennel, dog runway or the like characterized by non-fabric components which will not be adversely affected by the chewing action of the animals housed therein.

It is yet another object and feature of this invention to provide a door assembly of the type aforementioned comprising relatively rigid components which are relatively unaffected by the chewing action of the animals and by strong disinfectants and cleaning chemicals, while being readily washable or cleanable without removing the door assembly from the kennel.

It is yet another object and feature of this invention to provide a door assembly of the type aforementioned including a transparent door member permitting the animals housed within the enclosure to see to the exterior thereof for the purpose of investigating disturbances or other attractions originating therefrom without leaving the interior of the enclosure.

It is yet another object and feature of this invention to provide a door assembly of the type aforementioned including a door frame adapted to be hinged to the wall of a kennel adjacent an opening therein and including an opening therethrough, and a transparent door hinged to the door frame and forming a closure for the opening therethrough in such a manner as to permit animals to enter and leave the kennel simultaneously through the door assembly.

It is yet another object and feature of this invention to provide, in combination with a kennel having an opening therein, a door assembly permitting ingress and egress through the opening in the kennel and comprising a door frame of suitable plastic, aluminum or similar metal having a large substantially central opening therethrough, spring biased hinge means mounting one side wall of the door frame to a wall of the kennel exteriorly of the latter, the door frame being sufficiently large so as to extend beyond the edges of the opening and abut the wall of the kennel exteriorly thereof under the influence of the spring biased hinge means and being swingable away from the wall upon engagement by an animal leaving the kennel, a door of durable transparent material forming a closure for the opening in the door frame, and spring biased hinge means connecting one edge of the transparent door to the opposite side wall of the door frame for swinging movement with the latter away from the wall of the kennel as an animal exits therefrom, while being independently swingable away from the door frame in any position of the latter upon engagement thereof by an animal entering the kennel.

Still further objects, features and advantages of the invention will appear as the description proceeds.

To the accomplishment of the foregoing and related ends, the invention, then, consists of the door means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

FIGURE 1 is a perspective view of the exterior of a kennel and illustrates the manner in which the door assembly of this invention swings away from the kennel opening to permit an animal to leave same.

FIGURE 2 is a top plan view of the door assembly of FIGURE 1 and illustrates in phantom lines the swinging action of the two main components of the door assembly.

Figure 3:
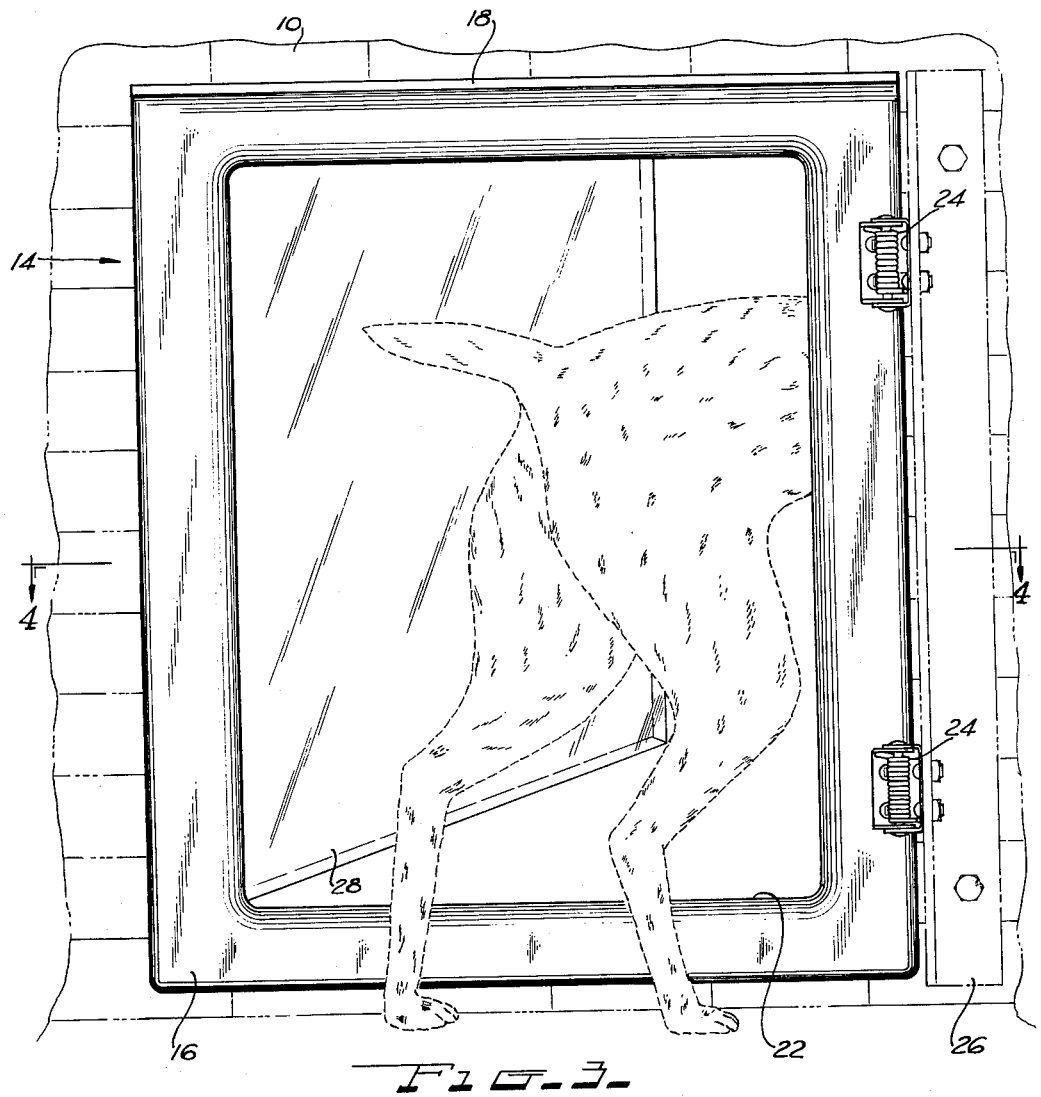
FIGURE 3 is an elevation of the door assembly mounted on an exterior wall of a kennel, and illustrates the manner in which an animal enters the interior of the kennel.
Figure 4:
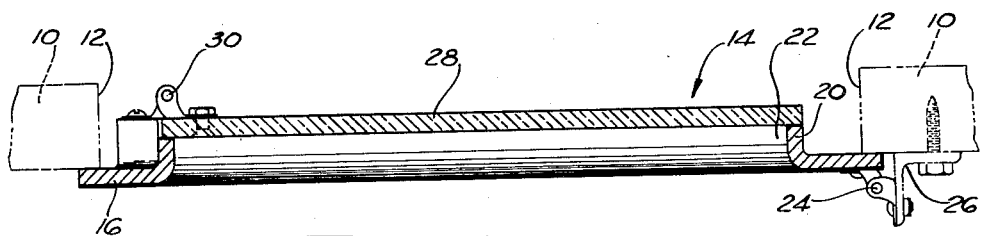
FIGURE 4 is a sectional view taken on the line 4—4 of FIGURE 3, looking in the direction of the arrows, but illustrating the disposition of the door assembly when an animal is not passing therethrough.

Referring now to the drawings, the numeral 10 indicates a well of a kennel, dog runway or the like defining a rectangular opening 12 therein, while the numeral 14 generally indicates a door assembly forming a swingable closure for the opening 12. The door assembly 14 comprises a rectangular door frame 16 including a weather shield or ledge 18 extending along and projecting from one side of its upper edge, and a continuous rectangular flange or lip 20 projecting from the opposite side of the door frame and defining an opening 22 therethrough. Preferably, the door frame is fabricated from a lightweight metal alloy such as of aluminum or magnesium which is durable and resistant to rust, corrosion, and the elements in general. A pair of conventional hinges 24 of the spring-return type are secured in vertically spaced relation to one side wall portion of the door frame 16 and are adapted to be connected in suitable fashion, such as to an angle iron 26 rigidly secured vertically to the wall 10 exteriorly of the kennel, adjacent one edge of the opening 12 therein. As will be readily apparent from the drawings, the rectangular door frame 16 is sufficiently larger than the rectangular opening 12 so that the hinges 24 will continuously urge the door frame into a position extending completely across the opening 12 and abuting wall 10 exteriorly of the kennel.

A rectangular door 28 made of any suitable durable and relatively rigid, transparent material, such as "Plexiglas," has one edge thereof suitably hingedly connected by a pair of vertically spaced hinges 30 to a side wall portion of the door frame 16 opposite the side wall portion thereof connected to the hinges 24 and on the other side of the door frame. Preferably, the hinges 30 are of the spring-return type as are the hinges 24. As will be apparent from the drawings, the hinges 30 are secured to the door frame 16 on the side thereof presented to the interior of the kennel and continuously urge the transparent door 28 into abuting engagement with the terminal edge of the flange or lip 20 of the door frame to form a closure for the opening 22 therethrough. In this regard, it will be noted that, while the door 28 is large enough to cover the opening 22 in door frame 16, it is small enough to pass through openings 12 in wall 10 of the kennel.

With particular reference to FIGURES 2 and 3, a dog wishing to enter the kennel will push his nose against the right hand side of the transparent door 28, as he enters the kennel causing same to swing as indicated in dotted lines in FIGURE 2 to permit the dog to enter. After he has entered the kennel and completely cleared the door assembly, the hinges 30 will, of course, return the door 28 to the full line position indicated in FIGURE 2. As will be appreciated, the spring-return type hinges 24 and 30 are sufficiently strong to resist and normally prevent opening of the door assembly 14 as well as door 28 under the influence of winds and the like, while being sufficiently weak to permit even small dogs to operate the door and door assembly as previously described.

With particular reference to FIGURES 1 and 2, a dog desiring to leave the kennel again approaches the door assembly from the right and engages the right edge of the transparent door 28 with his nose causing the door assembly 14 to swing outwardly away from the opening 12 as indicated in dotted lines in FIGURE 2 and illustrated in full lines in FIGURE 1, thereby opening the door so that the dog can leave the kennel. After the dog leaves the kennel and clears the door assembly 14, the hinges 24 will return the door assembly to the full line position illustrated in FIGURE 2, it again being understood that the spring pressure of the hinges 24 is sufficient for this purpose while being readily overcome by even small dogs.

Furthermore, the door assembly will even function to permit a small dog to enter and another small dog to leave the kennel simultaneously through the opening 12. Thus, as a dog enters the kennel as illustrated in FIGURE 3, the door 28 will swing inwardly of the kennel as indicated in dotted lines in FIGURE 2. Another dog wishing to leave the kennel simultaneously will approach the door assembly from the right, engage the transparent door 28, and swing the whole door assembly 14 outwardly of the kennel and leave the latter.

Since the door assembly is always approached on the right irrespective of whether a dog is entering or leaving the kennel, it has been found to be a relatively simple matter to condition dogs to use the door assembly. Furthermore, this feature of the invention facilitates simultaneous exit and entry through the door assembly as aforedescribed.

Thus, the door assembly 14 will maintain the interior of the kennel substantially draft proof and insect free while permitting ready ingress and egress by dogs, even simultaneously. The weather shield or ledge 18 helps prevent rain, snow and the like from striking directly against the upper portion of the transparent door 28 and helps in sealing the joint between the door 28 and the flange or lip 20 of door frame 16. Furthermore, since the door frame 16 is preferably made of a lightweight metal such as an aluminum or magnesium alloy and the door 28 is of a durable transparent material such as "Plexiglas," the door assembly is quite durable and desistant to rust, corrosion and the elements in general. While the dogs may attempt to chew or paw the door assembly or various components thereof, their chewing and pawing action will not affect functioning of the door. In addition, should a dog within the kennel be atracted from some source exteriorly thereof, he can readily see through the transparent door 28 to investigate to his satisfaction rather than getting up and leaving the kennel. Finally, it will be readily apparent that the door assembly may be easily wiped clean while in place on the kennel wall, and even strong disinfectants and cleaning chemicals may be used without damaging the assembly while effectively removing bacteria therefrom.

At this juncture it should be noted that, although the foregoing detailed description makes particular reference to an enclosure for dogs to facilitate an understanding of the features and advantages of the invention, the door assembly of this invention may be employed to advantage on enclosures for other types of small animals, domesticated and otherwise, and including by way of example such animals at cats, rabbits, pigs, sheep and the like.

While but one form of the invention has been shown and described, other forms within the obvious spirit and scope of the invention will not be apparent to those skilled in the art. Therefore, it will be understod that the embodiment shown in the drawing and described above is merely for illustrative purposes, and is not intended to limit the spirit adn scope of the invention.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

In combination, an animal enclosure including means defining an opening therein, a door assembly permitting ingress and egress through said opening, said door assembly comprising a door frame including means defining an opening therethrough, first hinge means connecting one wall portion of said door frame adjacent one side of said opening therethrough to said enclosure for swinging movement of said door frame between a first position extending across said opening in said enclosure and a second position away therefrom, a single door forming a complete closure for said opening in said door frame, and second hinge means connecting one edge of said door to another wall portion of said door frame adjacent another side of said opening therethrough for swing movemen therewith toward said second position thereof and permitting said door to swing relatively to said door frame to expose the opening in the latter in any position of said door frame, wherein said door frame is larger than the opening said animal enclosure and said door is larger than the opening in said door frame and smaller than the opening in said animal closure, said respective hinge means each including spring means continously urging said door frame toward said first position thereof abutting said animal enclosure and said door into abutting engagement with said door frame in any position of the latter.

References Cited in the file of this patent

UNITED STATES PATENTS

| | | |
|---|---|---|
| 42,710 | Wagner | May 10, 1864 |
| 229,502 | Wagner | June 29, 1880 |
| 533,777 | Belcsak | Feb. 5, 1895 |
| 1,828,137 | Gay | Oct. 20, 1931 |
| 1,919,418 | Dudley | July 25, 1933 |
| 2,758,646 | Johnson | Aug. 14, 1956 |
| 2,839,791 | Lee | June 24, 1958 |

UNITED STATES PATENT OFFICE
CERTIFICATE OF CORRECTION

Patent No. 3,138,829            June 30, 1964

Edward J. Grose

It is hereby certified that error appears in the above numbered patent requiring correction and that the said Letters Patent should read as corrected below.

Column 1, line 34, for "bacterial-laden" read -- bacteria-laden --; column 4, line 41, for "atracted" read -- attracted --; line 60, for "not" read -- now --; line 61, for "understod" read -- understood --; line 64, for "adn" read -- and --; column 6, line 9, for "42,710" read -- 42,719 --.

Signed and sealed this 3rd day of November 1964.

(SEAL)
Attest:

ERNEST W. SWIDER
Attesting Officer

EDWARD J. BRENNER
Commissioner of Patents